United States Patent
Ito et al.

(10) Patent No.: US 7,425,950 B2
(45) Date of Patent: Sep. 16, 2008

(54) WEB 3D IMAGE DISPLAY SYSTEM

(75) Inventors: Masahiro Ito, Tokyo (JP); Amram Racabi, Sa'ar (IL); Oran Agra, Sa'ar (IL); Yoav Steinberg, Sa'ar (IL)

(73) Assignee: Yappa Corporation (JP)

( * ) Notice: Subject to any disclaimer, the term of this patent is extended or adjusted under 35 U.S.C. 154(b) by 228 days.

(21) Appl. No.: 10/486,690

(22) PCT Filed: Oct. 11, 2002

(86) PCT No.: PCT/JP02/10625

§ 371 (c)(1), (2), (4) Date: Feb. 13, 2004

(87) PCT Pub. No.: WO03/034345

PCT Pub. Date: Apr. 24, 2003

(65) Prior Publication Data

US 2004/0239679 A1 Dec. 2, 2004

(30) Foreign Application Priority Data

Oct. 11, 2001 (JP) .............................. 2001-314615

(51) Int. Cl.
*G06T 15/00* (2006.01)
(52) U.S. Cl. ...................................... 345/419; 345/420
(58) Field of Classification Search .................. None
See application file for complete search history.

(56) References Cited

U.S. PATENT DOCUMENTS

2002/0070932 A1* 6/2002 Kim ........................... 345/419
2002/0108050 A1 8/2002 Daniel et al.
2002/0174209 A1* 11/2002 Moyer et al. ................. 709/221

(Continued)

FOREIGN PATENT DOCUMENTS

CA 2-341-931 9/2001

(Continued)

OTHER PUBLICATIONS

Isakovic, K., 3D Engine List Java, Oct. 4, 2000, Technical University of Berlin, http://cg.cs.tu-berlin.del/~ki/3del_1419_lang_j.html.*

(Continued)

*Primary Examiner*—Ulka Chauhan
*Assistant Examiner*—Said Broome
(74) *Attorney, Agent, or Firm*—Lowe Hauptman Ham & Berner, LLP

(57) ABSTRACT

A Web-based 3D-image display system that downloads 3D-image files from a Web server and smoothly displays 3D-images on a Web browser. The Web-based 3D-image display system is provided with a Web server storing compressed 3D files that have been edited and created based on 3D-scene information extracted from a VRML file or the like, and a 3DA applet for displaying 3D scenes; and a Web browser for displaying the 3D scene. The Web browser requests and downloads the 3D applet from the Web server and requests and downloads the compressed 3D file from the Web server by executing the 3D applet. After downloading and receiving all information, the Web browser continuously displays an interactive 3D-scene by executing, independently of the Web server, real-time 3D-rendering and 3D-motion algorithms using the 3D applet.

15 Claims, 10 Drawing Sheets

U.S. PATENT DOCUMENTS

2003/0030636 A1* 2/2003 Yamaoka .................... 345/419

OTHER PUBLICATIONS

Java Documentation, Mar. 4, 2000, http://web.archive.org/web/20000304113932/http://www.shout3d.com/shout3d_doc_dir/docs/javadocs/index.html.*

Polevoi, R., Oct. 10, 2000, 3D Animation Workshop Lessons 75-79, http://www.webreference.com/3d/index.html.*

Richardson, J., Jul. 1-3, 1998, VRML Based Behavior Database Editor, Virtual Worlds, First International Conference, pp. 1-12.*

Shout3D 1.0—Home, Apr. 7, 2000, http://web.archive.org/web/20000407093457/http://www.shout3d.com/shout3d_doc_dir/index.html.*

Jern M ED-Wolter F-E et al: "Thin vs. fat visualization client" Computer Graphics International 1998. Hanover, Germany Jun. 22-26, 1998, Los Alamitos, CA Jun. 22, 1998, p. 776 Section "Java Based Thin client" p. 778, section: "Viewing vs. client data visualization".

Vad De Wetering H.: "Javra: a simple, extensible Java package for VRML" Proc. on computer graphics international conf. 2001, Jul. 3, 2001 pp. 333-336.

Raposo A B et al: "Working with remote VRML scenes through low-badwidh connections" Computer Graphics and Image Processing, 1997 proceeding, X Brazilian Symposium on Campos do Jordai, Brazil Oct. 14-17, 1997, Los Alamitos, CA, USA, Oct. 14, 1997, pp. 34-41.

Jern M ed-Wolter F-e et al: "Thin vs. fat visalization client" Computer Graphics International, 1998. Proceeding Hannover, Germany Jun. 22-26, 1998, Los Alamitos, CA, USA, IEEE Comput. Soc, US, Jun. 22, 1998, pp. 772-788.

Van de Wetering H: "Javra: a simple, extensible Java package for VRML" Proc. on computer graphics international conf. 2001, Jul. 3, 2001, pp. 333-336.

"Working with Remote VRML Scenes through Low-Bandwidth Connections" Alberto Barbosa Raposo et al, Campinas, SP, Brazil, 1997 IEEE.

* cited by examiner

Fig.5

```
<applet code ="Applet3da.class" codebase="../" width="360" height="240"
 id="Applet1" ARCHIVE="3danywhere.zip" MAYSCRIPT>  —— 201
    <param name="Source" value="example.3da">  —— 202
    <param name="Toolbar" value="default.tbf">  —— 203
    <param name="BGColor" value="000000">  —— 204
    <param name="EventsFunction" value="My3daEventFunction">  —— 205
</applet>  —— 206
.
.
.
<script language="JavaScript">  —— 301
function My3daEventFunction(iType, Param1, Param2)  —— 302
{
    if(iType==2)  //Selected transform has changed  —— 303
    {
        alert(Param1);
        alert(true);   —— 304
    }
}
</script>  —— 305
```

WEB 3D IMAGE DISPLAY SYSTEM

DETAILED DESCRIPTION OF THE INVENTION

1. Field of the Invention

The present invention relates to a Web-based, bi-directional real-time, three-dimensional (3D) image-display system, and particularly to such a system that reduces the file size of 3D-image files downloaded from a Web server to a Web browser, enabling a client-user to transmit and display 3D images over an ordinary communication line for Internet access, without requiring that a special 3D-viewer plug-in be installed in the Web browser and without requiring a broadband communications system.

2. Description of the Related Art

A VRML browser well known in the art is one example of a conventional Web-based 3D-image display system. VRML (Virtual Reality Modeling Language) is a language for describing three-dimensional graphics created on the Web in an ordinary text file. A VRML browser is a Web browser capable of directly reading and displaying such a VRML file. The VRML browser can display 3D images using a special 3D-viewer plug-in, such as Live3D (brand name).

However, since the VRML browser requires the installation of a special 3D-viewer plug-in, the client-user must download the plug-in from a Website on which the plug-in is offered. The client-user also must perform numerous troublesome operations in order to create files for 3D scenes to achieve interactivity in the VRML browser.

A tool for reducing these troublesome operations has been disclosed in PCT Publication No. WO98/33150. This tool links VRML with the JAVA language in order to implement an interactive 3D world.

However, while PCT Publication No. WO98/33150 provides a development tool for creating an interactive 3D world, the tool requires the use of a VRML browser. The VRML browser takes a considerably long time to download 3D images and the like from the Web server, as the images are downloaded in an uncompressed form. Even with the use of a broadband communications system, it may be difficult to achieve a transmission speed with this tool that will satisfy the client-user, placing limitations on how 3D images obtained via the Internet are displayed.

DISCLOSURE OF THE INVENTION

In view of the foregoing, it is an object of the present invention to provide a Web-based 3D-image display system capable of downloading 3D image files from a Web server at a high speed and displaying interactive 3D images on a common Web browser installed on a client computer or other device, without the need for installing a special 3D-viewer plug-in in the Web browser.

These objects and others will be attained by a Web-based 3D-image display system that downloads a 3D-image file from a Web server and displays a 3D image on a Web browser. The Web-based 3D-image display system comprises a Web server storing compressed 3D files that have been edited and created based on 3D-scene information extracted from a VRML file or other standard descriptive language for describing Web-based 3D graphics, and a 3D applet for displaying 3D scenes by executing real-time 3D-rendering and 3D-motion algorithms; and a Web browser for downloading the compressed 3D-image file and the 3D applet from the Web server and displaying a 3D image based thereon. The Web browser comprises 3D applet requesting means for requesting and downloading the 3D applet from the Web server through communications with the same; compressed 3D file requesting means for requesting and downloading the compressed 3D file from the Web server by executing the 3D applet; optional information requesting means for requesting and downloading optional information from the Web server, including such optional information as an image of a scene's background, a shape texture, and an applet toolbar; 3D applet executing means for executing the 3D applet independently of the Web server after downloading the 3D applet and receiving all necessary information; 3D scene displaying means for continuously displaying 3D scenes by executing independently of the Web server real-time 3D-rendering and 3D-motion algorithms using the 3D applet executing means; and interactive display processing means for enabling client-users to interact with the displayed 3D scene.

According to another aspect of the present invention, a Web-based 3D-image display system is provided to load a 3D-image file stored in a storage device and display a 3D image on a Web browser. The Web-based 3D-image display system comprises Web-based 3D file creating means for generating a 3D object by using a 3D modeling software program and converting the 3D object or an entire 3D scene into a VRML file or other standard descriptive language for describing Web-based 3D graphics; 3D scene customizing means for customizing a 3D scene based on the Web-based 3D graphics file created by the Web-based 3D file creating means and applying information regarding how to display the 3D scene on a Web browser; compressed 3D file generating means for creating a 3D file having a transmission size made smaller by compressing all of the 3D-scene information; 3D applet generating means for generating a 3D applet that executes real-time 3D rendering and motion algorithms on the Web browser based on 3D scene information in the compressed 3D file in order to display a 3D scene; Web page creating means for creating a Web page of an HTML document comprising an applet tag for calling a 3D applet; 3D information storing means for storing in a storage device 3D information required for displaying a 3D scene, the 3D information comprising the compressed 3D file, the 3D applet, the Web page, object texture files, and an optional toolbar file; 3D applet executing means for requesting a 3D applet stored in the storage device, loading the 3D information file stored in the storage device, and executing the 3D applet; and interactive display processing means for displaying a user-interactive 3D scene achieved when the 3D applet executing means executes the 3D applet.

According to another aspect of the present invention, the interactive display processing means enables the Web browser to edit and process a 3D scene independently of the Web server by transferring client-user events input by a keyboard, mouse, or the like to the 3D applet for moving and changing a downloaded toolbar and scene objects.

According to another aspect of the present invention, the Web-based 3D-image display system further comprises licensing information processing means for comparing the domain of the Web server itself with domain data embedded in the 3D applet when the Web browser downloads the 3D applet from the Web server and displays a 3D scene.

According to another aspect of the present invention, the licensing information processing means compares the two domains and displays a license mark and warning in the drawing area of the 3D scene when the domains do not match.

According to another aspect of the present invention, the 3D applet comprises a plurality of applet classes including at least such scene element classes as shape, coordinate transform, light, and camera; such shader classes as wire frame, flat shading, and Gouraud shading; and various core classes for displaying 3D images; whereby the classes necessary for displaying the 3D scene are selected and saved as a single compressed file.

According to another aspect of the present invention, the 3D applet comprises an original JavaScript interface capable of achieving user-interactivity through the JavaScript code on a Web page.

According to another aspect of the present invention, the JavaScript interface includes at least information regarding objects, shapes, coordinates, cameras, animation, image displaying, and user interface in order to display interactive 3D images.

According to another aspect of the present invention, the compressed 3D file is stored in a single binary file and comprises 3D scene information called from an applet, including at least information regarding shapes, coordinate transform, lights, and cameras.

BRIEF DESCRIPTION OF THE DRAWINGS

In the drawings:

FIG. 5 shows sample HTML source code for an applet and JavaScript;

BEST MODE FOR CARRYING OUT THE INVENTION

Figure 1:
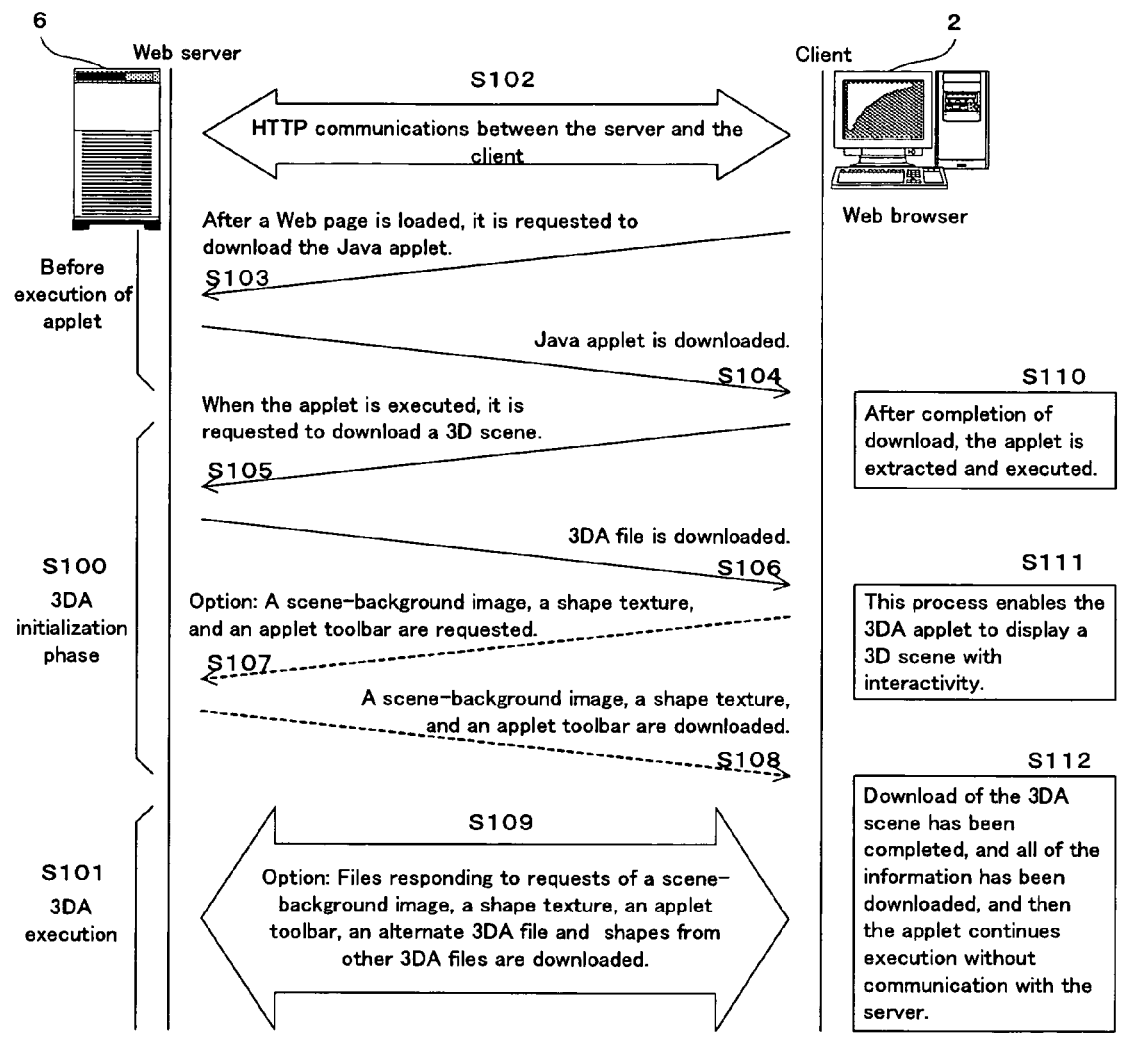
FIG. 1 shows the transmission process performed by the Web-based 3D-image display system according to a first embodiment of the present invention.

A Web-based 3D-image display system according to preferred embodiments of the present invention will be described while referring to the accompanying drawings. FIG. 1 shows the transmission process performed by the Web-based 3D-image display system according to a first embodiment of the present invention.

As shown in FIG. 1, the Web-based 3D-image display system includes a standard Web server 6 (not a special 3D server) and an ordinary Web browser 2 capable of displaying 3D images without a special 3D-viewer plug-in.

The Web server 6 and Web browser 2 are each installed and executed on a commercial personal computer or workstation comprising an ordinary computer system well known in the art. The personal computer or workstation is provided with a central processing unit (CPU); storage devices, such as RAM memory and a hard disk; a display device for displaying images, text, and the like; an input device, such as a keyboard, mouse, or the like; input/output devices connected to a communication line; and the like. As these components are well known in the art, a description has been omitted here.

The Web server 6 has both a 3DA file that is a compressed 3D-image file and a 3DA applet that is used for controlling the attributes of the 3DA file. Here, the "A" in "3DA" stands for "anywhere," signifying "something ordinary seen anywhere" as opposed to "something special seen only under certain conditions." Therefore, hereinafter, these compressed 3D files and 3D applets will be referred to as "3DA files" and "3DA applets," respectively.

Compressed 3DA files are created as original files having data necessary for a 3DA applet to display an interactive 3D scene. The 3DA files are created using files of the VRML description format (Web-based 3D files) as an input tool and using the VRML file descriptions of 3D worlds and 3D shapes.

When creating a 3DA file, a VRML file (which is not a compressed file, but an ordinary text file) is used only for importing 3D-scene information, because a VRML file does not contain any information that is necessary for displaying a 3D scene but contains some information that is not necessary for that purpose. In the present invention, a 3DA file stores only the information that is necessary for using a 3DA applet to display a 3D scene. Such a 3DA file or 3DA applet is compressed by the ordinary ZIP compression method and is stored in the Web server 6.

A 3DA applet is a JAVA mini-program that, when downloaded in a Web page, executes real-time 3D-rendering and 3D-motion algorithms. When a Web page containing a 3DA applet tag is viewed from a Web browser 2, the 3DA applet is automatically downloaded according to the conditions of the Web browser 2, provided that JAVA is enabled in the Web browser 2. Once downloaded, the 3DA applet is executed by the Web browser 2. The 3DA applet then requests from the Web server 6 all of the scene information in the aforementioned 3DA file, and graphic algorithms are used to render 3D scenes and to cause 3D objects to behave in specified ways. This means that once the Web browser 2 has received the data of all scenes as a result of the functioning of the 3DA applet, there is no need for further communication between the Web browser 2 and the Web server 6.

Hence, the Web browser 2 performs all graphics movements and interactive responses, eliminating the need to use a broadband communications line when transmitting 3D-image data. This is made possible by (1) minimizing the sizes (to approximately 100 KB or less) of both the 3DA files and the 3DA applets; (2) compressing a 3DA applet into a JAVA class file that is automatically opened by the Web browser 2; and (3) compressing the scene information in the 3DA file to minimize the amount of information that needs to be transmitted. An average animation file greatly exceeds 1 MB in size, but if that data is converted into a 3DA file, it will be only about 100 KB (less than 1/10 of the original size).

Next, the real-time 3D-image displaying process of this system will be described while referring to FIG. 1. FIG. 1 shows the communication procedures, or interaction, between the Web browser 2 of the client computer and the Web server 6 via HTTP communication. In other words, FIG. 1 represents the browser-server communication before and after execution of a 3DA applet.

After the initialization phase is completed in S100, the 3DA processing program is executed in S101. In S102, HTTP communications is initiated between the Web server 6 and the Web browser 2. After a Web page containing a 3DA applet is loaded in the Web server 6, the client-user's Web browser 2 requests to download the 3DA applet in S103. In response to that request, the Web server 6 sends the 3DA applet to the Web browser 2 in S104. When the 3DA applet is executed in the Web browser 2, the Web browser 2 then requests to download a 3DA file in S105.

In response to that request, the Web server 6 sends the 3DA file to the Web browser 2 in S106. As an option, the Web browser 2 can request further information from the server in S107, such as a scene-background image, a shape texture, and an applet toolbar. The scene-background image is displayed as a background behind the 3D scene; the shape texture is used for changing the appearance and feel of an object's surface; and the applet toolbar is used for moving, rotating, enlarging, and reducing an object, rendering a scene, and selecting the type of rendering-functions that are accessed via the tool buttons and are equivalent to the functions of an editing-toolbar menu. In response to the respective optional request, the Web server 6 sends a background image, a shape texture, or an applet toolbar to the Web browser 2 in S108.

As another option, the Web browser 2 can request an alternate 3DA file and/or a shape or shapes from other 3DA files. The download response to these requests is performed in S109 by a JavaScript code described in an HTML file and executed by the Web browser 2.

Once the 3DA applet, the 3DA file, and the optional items have been downloaded, the Web browser 2 extracts the required applet classes (described later) from the 3DA applet and executes the 3DA applet, by which real-time rendering and motion algorithms are executed (S110). This process enables the 3DA applet to display a 3D scene with interactivity (S111). By manipulating an applet toolbar or other interactive-display processing tool, the client-user of the Web browser 2 can create rasterized 3D images and interactively edit 3D scenes using background images, shape textures, and the like. Thus, when the 3DA file and other data needed to display a 3D scene have been downloaded, all of the information thereof has been transferred to the Web browser 2, enabling the 3DA applet to continue execution on the Web browser 2 without needing to be in communication with the Web server 6 (S112).

Next, the operations of a Web-based 3D-image display system according to a second embodiment of the present invention will be described, while referring to FIG. 2. While the first embodiment is configured based on communications between a Web server and Web browser, the system of the second embodiment, shown in FIG. 2, includes a developing tool called a 3DA designer application for creating 3DA files and 3DA applets. This developing tool is installed on a computer. The 3DA files and 3DA applets are called from a storage device mounted in the same computer and executed by a Web browser.

The Web browser 2 and 3DA designer application (not shown) are installed and executed on a commercial personal computer or workstation comprising a central processing unit (CPU); storage devices, such as RAM memory and a hard disk; a display device for displaying images, text, and the like; an input device, such as a keyboard, mouse, or the like; other input/output devices; and the like. Accordingly, a description of these components and their drawings have been omitted here.

Further, the second embodiment shows a 3D displaying method that involves creating a 3D object by use of a third-party modeling software package such as "3ds max" (brand name), converting the 3D object into a VRML file, and generating a 3DA file. The modeling software to be used in this invention is not limited to 3ds max, but other 3D software can also be used for creating 3D objects.

Next, the operations of the 3DA designers and the 3D displaying process performed by the Web browser 2 will be described, while referring to FIG. 2. First, a 3D object is created by use of a third-party modeling program (S200). For example, typical procedures performed with 3ds max include modifying the motion, camera, lighting, and material of a 3D object.

A 3D object created using a third-party modeling program or an entire scene from such a 3D object is exported in VRML format (S201). This VRML file is imported into the 3DA designer (S202), where the 3D scene is customized as required (S203), and information describing how to display the 3D scene on a Web page (information that corresponds to the 3DA applet) is provided (S204). Information imported into the 3DA designer from the VRML file includes object data, such as data for a polygon's vertexes, surface, and color, and image data applied to each surface; scene data, such as the camera and lighting; and animation data for each object. The 3D scene can be customized by setting object data, such as shading; scene data, such as the positions of cameras and lights; animation data for editing the animation of each object, assigning names, and the like; display data, such as background images, image size, and other scene attributes; and the like.

After all 3D data required to display the scene is converted to a binary format, all the 3D scene information is compressed using ZIP compression or the like and saved in a storage device (not shown) as a single compressed 3DA file (S205). The 3DA designer creates a toolbar file for displaying the interactive 3D scene on the Web browser 2 and automatically generates a new Web page (HTML document) that includes a 3DA applet tag for calling the 3DA applet (S206). JavaScript code described later that accesses the 3DA applet can be added to the HTML document to modify the 3DA scene dynamically for enhanced operations and interactivity (S207, S208).

While interactive operations are possible with the JAVA applet alone, JavaScript code can be used to modify or redefine nearly all attributes of objects, scene animation, and display data and to describe data associated with HTML control. Thus, it is possible to create Web pages that implement more complex interactive operations.

All files necessary for displaying a 3D scene created according to the aforementioned method are saved to the storage device (S209). These files include a Web page (HTML document) having a 3DA applet tag, an optional toolbar file, texture images, a 3DA scene file, and the 3DA applet itself The 3DA applet calls the various 3D scene data that was set during the customization step and assembles all applet class files required for processing the applet. The data is compressed by standard ZIP compression and saved in the storage device as a single 3DA applet file.

Next, the Web browser 2 calls the HTML document that includes the 3DA applet tag and is stored in the storage device, and loads and executes the 3DA applet (S210). Once execution of the 3DA applet begins, an interactive 3D scene is displayed, and the 3D scene displaying process continues (S211).

Figure 4:
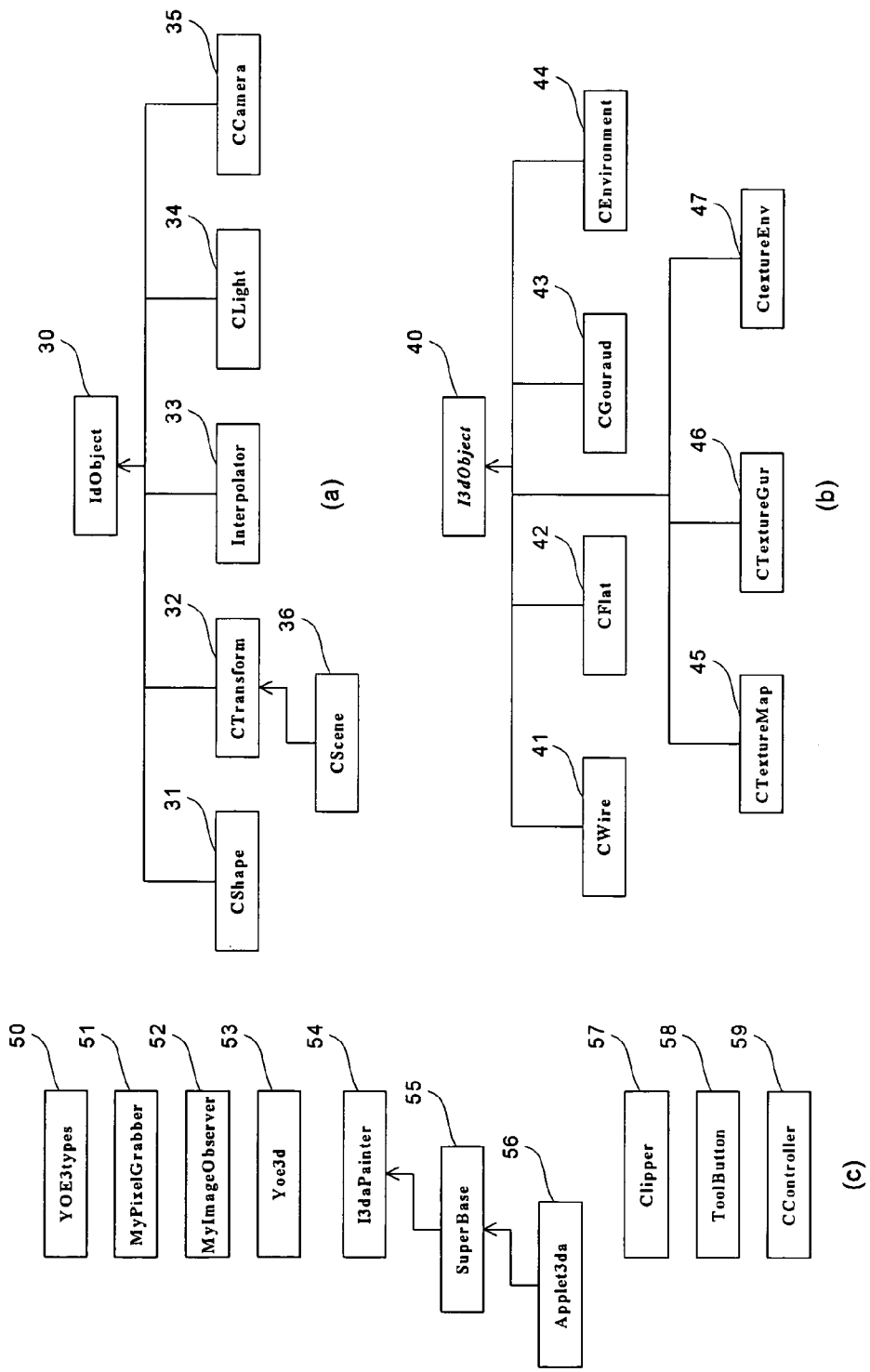
FIG. 4 shows the hierarchical structure of (a) scene elements, (b) shader classes, and (c) core classes in an applet.

Next, the structure of a 3DA applet according to the present invention will be described in more detail, while referring to FIG. 4. As shown in FIG. 4, a 3DA applet displays scene data configured by the rendering and movement of 3D objects. The 3D applet includes core classes that control 3D scenes. All scene data is always stored in a CScene 36 object. The CScene 36 object has a list of all scene elements inherited from the IdObject 30 base class. Rendering of a 3D scene is executed according to the Cscene 36 rendering method.

All client-user events, such as inputting via a keyboard or mouse, are routed to a CController 59 class. For example, if a client-user event occurs when the 3DA applet is already executing, the event-related information is transferred to the 3DA applet, and the CController 59 class changes the attribute of the IdObject 30 that is selected at that time. If the client-user moves the mouse when the mouse-movement's command function is set to "rotation," for example, the orientation attribute of the currently selected CTransform 32 class is changed.

The CShape 31 class represents actual 3D objects in the 3D scene. The attributes of the CShape 31 class contain all the information necessary for depicting 3D objects on the client-user's computer screen. All of the CShape 31 classes contain references to the neighboring CTransform 32 classes.

The CTransform 32 class has information concerning the location of the CShape 31 class used for locating the CShape 31 class in the 3D scene. Rendering is performed based on the information concerning each object and its location in the scene, but the I3dObject 40 class is used to render the class when depicting shapes. All the classes that implement the I3dObject 40 class interface (such as a CTextureMap 45 class that represents the appearance and feel of the material's surface and the like) can be drawn on the screen of the client-user's computer.

A Clipper 57 class is used, together with the shader class (the I3dObject 40 class), to raster-display (rasterize) a certain shape on the screen of the client-user's computer. Information relating to tool buttons in the toolbar is stored in an applet module. The toolbar information can be regarded as constituting normal menu options, such as selecting an object, moving an object, rotating an object, enlarging/reducing an object, rendering a scene, and selecting the type of rendering.

Next, the construction of the applet class in FIG. 4 will be described in separate sections (a)-(c).

The IdObject 30 in section (a) of FIG. 4 represents a scene element. All scene elements have a unique ID, which is a common feature represented by the IdObject 30 class. Accordingly, all scene elements inherit from this class. (Inheritance is a feature of object-oriented programming languages, of which JAVA is one.) A 3d scene is represented by a hierarchy of elements. The unique ID is used during the loading of scene information from the 3DA file to build this hierarchy. The hierarchy is constructed of the CTransform 32 objects (in this case, object is synonymous with class). Each CTransform 32 object might contain any number of scene elements of different types, including lights (CLight 34 objects), shapes (CShape 31 objects), other CTransform 32 objects, and the like. There always exists a root transform that contains all the scene elements. This special transform is called the scene transform and is represented by the single CScene 36 object included in the main applet class (Applet3da 56). The hierarchal structure of the information is essential for the 3D presentation of the scene. Each CTransform 32 object represents a location in the 3D world. All stored elements are displayed and moved relative to this location through coordinate conversion.

Next, each scene element class in FIG. 4(*a*) will be described.

The Interpolator 33 contains information about interpolation between a set of a values in a scene element. An interpolator class contains methods for sliding between these values; thus, gradually changing a property of a scene element. The scene elements that contain interpolators are Cshape 31 and Ctransform 32. Shapes use interpolators to perform morphing. Transforms use interpolators to perform movement and rotation. This is how the applet engine performs 3D animations. During the playing of an animation, interpolators "slide" between a set of values to modify the properties of scene elements (for example, the position property of a transform to perform movement or the coordinates of a shape to perform shape morphing). Whenever an animation is playing in the scene, a list of active interpolators contained in the CScene 36 object is advanced each frame to perform the changes in the scene—hence, the animation effect. Interpolators are aware of the passage of time and know how much time is required to advance their values. This is how an animation length (animation time) is controlled.

CLight 34 is used to define lighting of scene shapes. A light contains color properties that define the color and brightness of the light. There are two kinds of lights: Omni lights, which contain position information, and Spot lights, which contain direction information. Lights are positioned in a CTransform 32 object. When moving a transform that contains a light element, the light is also moved, causing changes in how scene shapes are lit. When a CShape 31 object is rendered on a screen using a shader object (I3dObject 40 class), the shader object checks the position, direction, and color of all scene lights to render the shape with the correct lighting.

A camera scene element, CCamera 35, defines a viewpoint. Each CCamera 35 object contains position and direction information. This information combined with the position of the transform in which the camera resides indicates a viewpoint from which the 3D scene can be rendered and viewed. The CController 59 object contains a reference to the active camera, which is the camera currently being used as the viewpoint to the scene. Each time the scene image is rendered, all 3D information is transformed to the coordinate space of the active camera, such that the active camera is at the world's origin (0,0,0). The CScene 36 object performs this transformation. Subsequently, the transformed scene is rendered, revealing how the 3D scene looks from the camera's point of view.

All classes in section (b) of FIG. 4 are called shaders; that is, objects (applet classes) related to the shading of 3D objects. All shaders have common features represented in the I3dObject 40 class. Hence, all shaders inherit from this class. A shader is owned by a CShape 31 object and is responsible for performing the rasterization (creation of a 2D bitmap image) of the CShape 31 by which it is owned. Each shader will render its shape differently. A shader will perform the actions needed to rasterize its shape taking into account scene lights, shape color information, shape texture information, and the like. Each shader might use this information in a different way or might disregard some of this information. A shape's shader is defined by its "shade type" property defined by the scene creator. Some shaders might produce textured shapes while other might produce smoothly shaded shapes, for instance.

Next, each shader class in FIG. 4(*b*) will be described.

Unlike other shaders, a CWire 41 class does not render the shape by filling the polygons comprising the shape. This shader draws the wire frame of the shape. In other words, the shader draws lines connecting all points of the polygons, creating a wire frame of the shape. The color information of the CShape 31 owning this shader is used as the color for the wire frame.

A CFlat 42 class renders a flat shaded shape. Flat shading is an algorithm in which each polygon of the shape receives a constant color dependant on the color of the shape and the lights in the scene.

A CGouraud 43 class renders a Gouraud shaded shape. Gouraud shading is an algorithm in which the color at the three points of each polygon of a shape is calculated according to the color of the shape and the lights in the scene. Subsequently, these colors are linearly interpolated across the polygon, creating smooth shading over the shape.

A CEnvironment 44 class renders a texture-mapped shape. The texture-mapping algorithm generates mapping information according to the orientation of the CTransform 32 object containing the CShape 31 being rendered. The algorithm used by this shader is identical to the algorithm used by the CTextureMap 45 shader, except for the source of the mapping information. Since mapping information here is dependent on the orientation of the shape, a rotating shape appears to be reflecting the environment or a light source. This illusion can be used to achieve realistic looking reflection and lighting using a simple texture-mapping algorithm.

The CTextureMap 45 class renders a texture-mapped shape. The texture-mapping algorithm uses mapping information stored in the CShape 31 object owning the shader object to map a texture bitmap onto the shape. This process causes a certain texture or an image to appear drawn on the rendered shape.

A CTextureGur 46 performs both Gouraud shading (like CGouraud 43) and texture mapping (like CTextureMap 45), while rendering the polygons of a shape. This results in a texture-mapped, smoothly shaded object.

A CTextureEnv 47 performs two texture-mapping operations with two different texture images and a different set of mapping coordinates and subsequently combines the images using a blending algorithm. Performing these two texture-mapping operations is equivalent to performing the CTextureMap 45 rendering algorithm and combining the result with that of the CEnvironment 44 rendering algorithm. This shader is used to give a shape both a texture image and a reflection/lighting effect.

Section (c) of FIG. 4 includes other core classes used by the 3DA designer JAVA engine. These classes contain information needed by the 3D engine and perform functions related to this information. For example, the Clipper 57 aids in rasterization; a MyPixelGrabber 51 object aids in loading image files; and CController 59 is responsible for changing scene information according to client-user input, to name a few.

Next, each core class in FIG. 4(*c*) will be described.

A YOE3types 50 class, which must be considered a core class, simply contains constants used by the CScene 36 class, but executes no functions and stores no data. When a 3DA scene file is loaded, the structure of the scene file is such that it contains nodes representing scene elements or general scene information. Each node can contain sub nodes and data fields. The different node types and data field types are identified by an ID number preceding them in the file. This class contains constants representing the IDs of the various possible data nodes and node fields. If the scene loader (implemented in the CScene 36 class) encounters an ID not existent in this class, the loader skips the node or data field belonging to this node.

A MyPixelGrabber 51 class is used by the applet to load images to be used in the scene (shape textures, background images, etc.). MyPixelGrabber 51 is used in conjunction with classes implementing a MyImageObserver 52 interface. When an image finishes loading, the MyPixelGrabber 51 object calls back its observer object to notify the object that the image is available. A practical example is provided in the description of the MyImageObserver 52 class.

The MyImageObserver 52 class defines an interface for a function to be called once an image has finished loading. Some classes implement the MyImageObserver 52 interface in order to be notified when an image they requested to load has finished loading. The actual loading of images by the applet is done using the MyPixelGrabber 51 object. When MyPixelGrabber finishes loading an image, the image is passed to the MyImageObserver 52 object. An example of such a case is when the applet loads a new background image. The Applet3da 56 class calls a method in a Yoe3d 53 class to set the new background image. The Yoe3d class, which implements the MyImageObserver interface, creates a MyPixelGrabber object to load the image and, when done, to call a function in its observer, in this case Yoe3d. At this time, Yoe3d contains the loaded image data and uses this data to set the applet's background.

The Yoe3d 53 class contains miscellaneous functions used for performing 3D geometrical operations, image processing and blending operations, rasterization operations, and the like. For example, before a shader class can draw 2D polygons on screen, the shader class must convert the 3D coordinates of each of its shape's polygons into 2D coordinate values using a perspective projection algorithm. The function performing this transformation is implemented in Yoe3d 53. This class also contains variables used during the rasterization of the 3D scene. For instance, in order to display overlapping 3D objects correctly, the shader class performs an algorithm called Z-Buffering while each 2D polygon is being filled into the bitmap image to be displayed. The Z-Buffering algorithm requires a large memory buffer for filling the distance from the viewpoint information of each rendered pixel. This memory buffer resides in the Yoe3d 53 class. The applet contains one global Yoe3d 53 object, which resides in the Applet3da 56 object.

An I3daPainter 54 is the parent class of a SuperBase 55 class, which is the parent of Applet3da 56 class. The I3daPainter 54 is a simple interface that contains no actual function for implementation. Other classes that implement the I3daPainter 54 inherit from different classes. This is also true for SuperBase 55, as SuperBase 55 inherits from the Applet class, a standard JAVA library class available on any JAVA-enabled system. The I3daPainter 54 contains an interface for handling events in the scene. Such events include clicking on a shape or a toolbar button, for instance. These events can then be processed accordingly. In the case of the Applet3da 56, these events are generated by a call from an external JavaScript function written by the author of the HTML page hosting the applet.

The SuperBase 55 class inherits from the Applet class, a standard Java library class available on any java enabled system, as described above. The basic functionality of this class is described below in the section on the Applet3d 56 class.

Next, the Applet3da 56 class will be described in greater detail.

The Applet3da 56 is the main applet class. It inherits from the JAVA Applet superclass. The Applet class provides a standard interface between applets and their environment and is implemented as part of the standard JAVA class library (available to every JAVA-enabled web browser). Every JAVA applet displayed on a web page must be a class that inherits from the Applet class and implements its essential interface. This interface includes a way to draw on the applet area, a way to handle client-user input (via mouse and keyboard events) to the applet, a way to export public functions implemented in the class so JavaScript being executed by the browser can call these functions.

By sub-classing the Applet class we define a new kind of applet called the 3DA applet. The Applet3da 56 does not inherit directly from the Applet class, but instead inherits from the SuperBase 55 class, which inherits from the Applet class.

Once the Applet3da class is loaded by the Web browser 2, the Web browser 2 calls the standard Applet interface functions implemented by the Applet3da 56:

1. First an init function is called. This function initializes the internal data of the Applet3da 56 and loads scene information into the internal data structures of the Applet3da 56.

2. Next, the browser calls a start function. This function prompts the Applet3da 56 to handle events received by the applet, such as mouse movement and keystrokes. The CController 59 object contained in the Applet3da 56 processes these events. The Applet3da 56 enters a loop in which it checks if there is a reason to render the 3D scene (if something has changed since the last rendering). If so, the scene is rendered. Then the Applet3da 56 calls the CController 59 class to update scene information based on received events, changes resulting from API functions called by the browser, executing animations, and object movement. This process is performed in a loop until the applet is closed. This loop looks something like the following:
   (a) Change since last frame?
   (b) Call controller to update scene information.
   (c) Perform 3D transformation of entire world in relation to current viewpoint. (This is accomplished by accessing the CScene 36 object stored in the Applet3da 56.)
   (d) Render the scene image. Loop back to (a).
3. When closing the applet, the Web browser 2 calls the stop and destroy functions of the Applet3da 56. These functions release scene information created and stored in the Applet3da 56.

The web browser knows to execute the Applet3da 56 because this is specified by the applet tag in the HTML file loaded by the browser. As shown by 201-206 of FIG. 5, the applet tag looks something like the following:
<applet code="Applet3da.class"codebase="../"width="360"height="240"id="Apple t1"ARCHIVE="3danywhere.zip"MAYSCRIPT>
   <param name="source"value="example.3da">
</APPLET>

Notice that the "code" part of the applet tag specifies the Applet3da 56 class file. This is the standard method for inserting applets into HTML pages.

Figure 6:
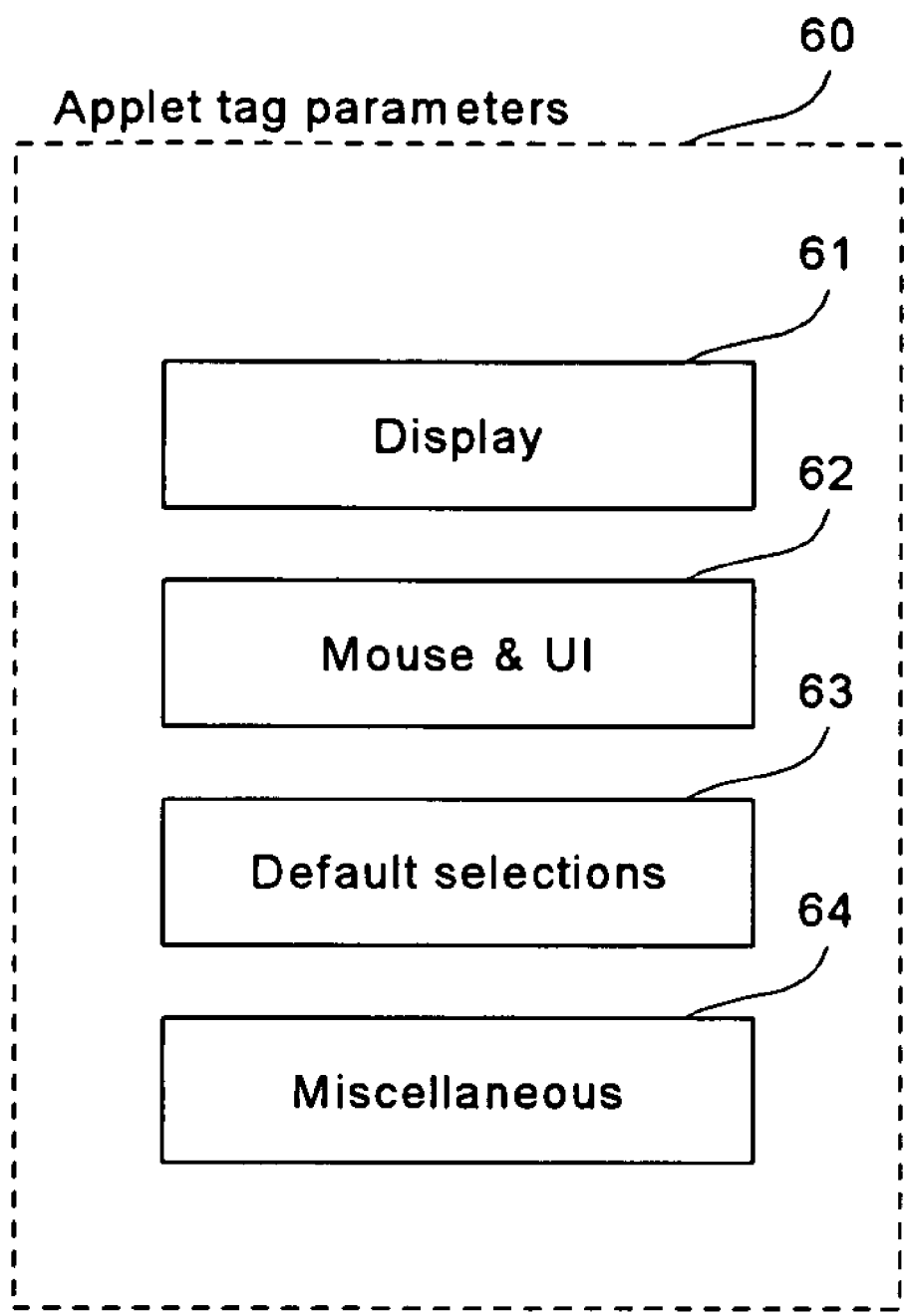
FIG. 6 shows the types of parameters in an applet tag.

FIG. 6 shows parameters prepared for the applet tags 202-205 shown in FIG. 5. As shown in FIG. 6, these parameters include a Display 61 related to such display parameters as background color, aspect, loading methods for textures and the like, antialiasing, and the like; a Mouse and User Interface 62 related to such operations as toolbar, mouse-operated camera control, rotational axis operations for 3D objects, coordinate movement, shapes, and the like; Default Selections 63 for setting an initial state for camera motion speed, movement coordinates, shape selection, 3D objects, and the like; and Miscellaneous parts for selecting event functions, enabling/disabling mouse events, and the like.

Figure 7:
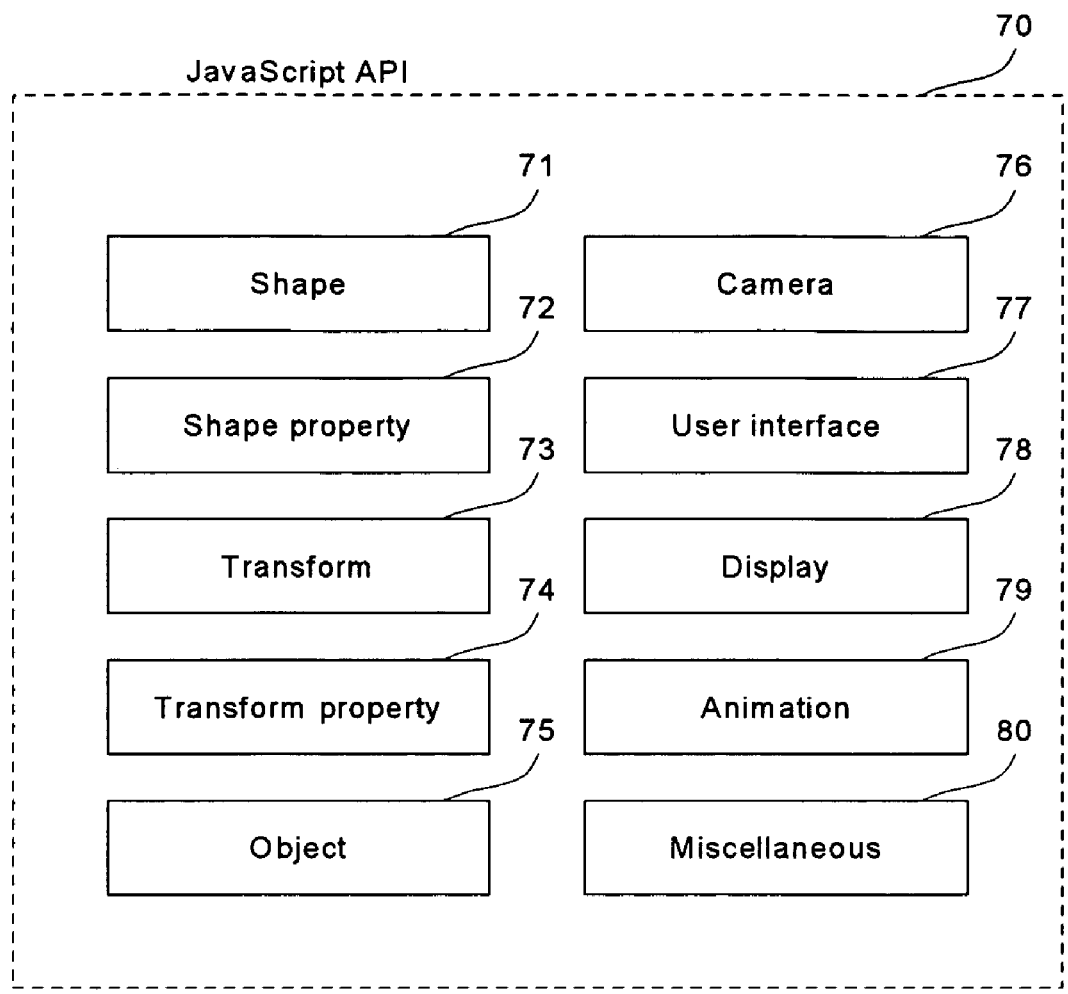
FIG. 7 shows the contents of JavaScript API.

FIG. 7 is an explanatory drawing showing the JavaScript API (Application Programming Interface) functions included in the 3DA applet. FIG. 7 also shows the original parts interfacing with JavaScript for displaying interactive 3D scenes described in an HTML page.

An example of the JavaScript code is shown in 301-305 of FIG. 5. In this example, an event occurs when the transform selected by My3daEventFunction (itype, Param1, Param2) of 302 changes (when itype=2).

As shown in FIG. 7, the JavaScript API includes Shape 71, Shape Properties 72, Transform 73 (coordinate transformation), Transform Properties 74, Object 75, Camera 76, User Interface 77, Display 78, Animation 79, Miscellaneous 80, and the like. A description of each function is as described above in relation to the 3DA applet and as described below. Next, JavaScript API will be described in more detail.

The Java Script API functions are all public functions implemented either in the Applet3da 56 class or the SuperBase 55 class. Each 3DA applet contains one instance of the Applet3da 56 class. This instance is the main Applet class loaded and executed by the Web browser (the way all JAVA applets are executed by a Web browser). Since there is no actual instance of the SuperBase 55 class and the Applet3da 56 inherits the SuperBase 55 class, it can be looked at as if all JavaScript API functions are implemented in the Applet3da 56. The reason some API functions are implemented in the Applet3da's super class (the SuperBase 55 class) is related to code organization.

The API functions access members of the Applet3da function to perform various operations in the applet. Some examples of this process are given below (not shown in the drawings).
1. A setBGColor( ) function accesses the "yoe3d.m_gbColor" member of the SuperBase 55 class to set its value. This value is used as the background color of the applet. The function subsequently calls the RedrawAfterAct( ) method of the Applet3da 56 to repaint the applet.
2. A setPos( ) function is used to set the position of a transform in the 3D scene. This operation is accomplished by accessing the controller object, a member of the SuperBase 55 class, to check whether a specific 3D transform is currently selected. Next, the function uses a method of the controller class to convert the position passed to the function into the coordinate system in which the selected transform resides. Subsequently, the function sets the selected "translation" member variable to the new position, and the RedrawAfterAct( ) method of the Applet3da 56 repaints the applet.

The above examples show that Applet3da 56 class contains member objects that manage different aspects of the applet. (The controller contains information about selected scene elements, while yoe3d 53 contains general information, such as applet background color.). These objects are accessed by different API functions, after which the applet scene is re-rendered to show the effects of this access. It is important to understand that these objects do not exist for the sole purpose of being accessed by API functions. These objects contain the scene information and are used to render the scene. For instance, client-user interaction with the applet triggers events. These events are also handled in the Applet3da 56 class, and these objects are accessed when the events are processed.

Figure 8:
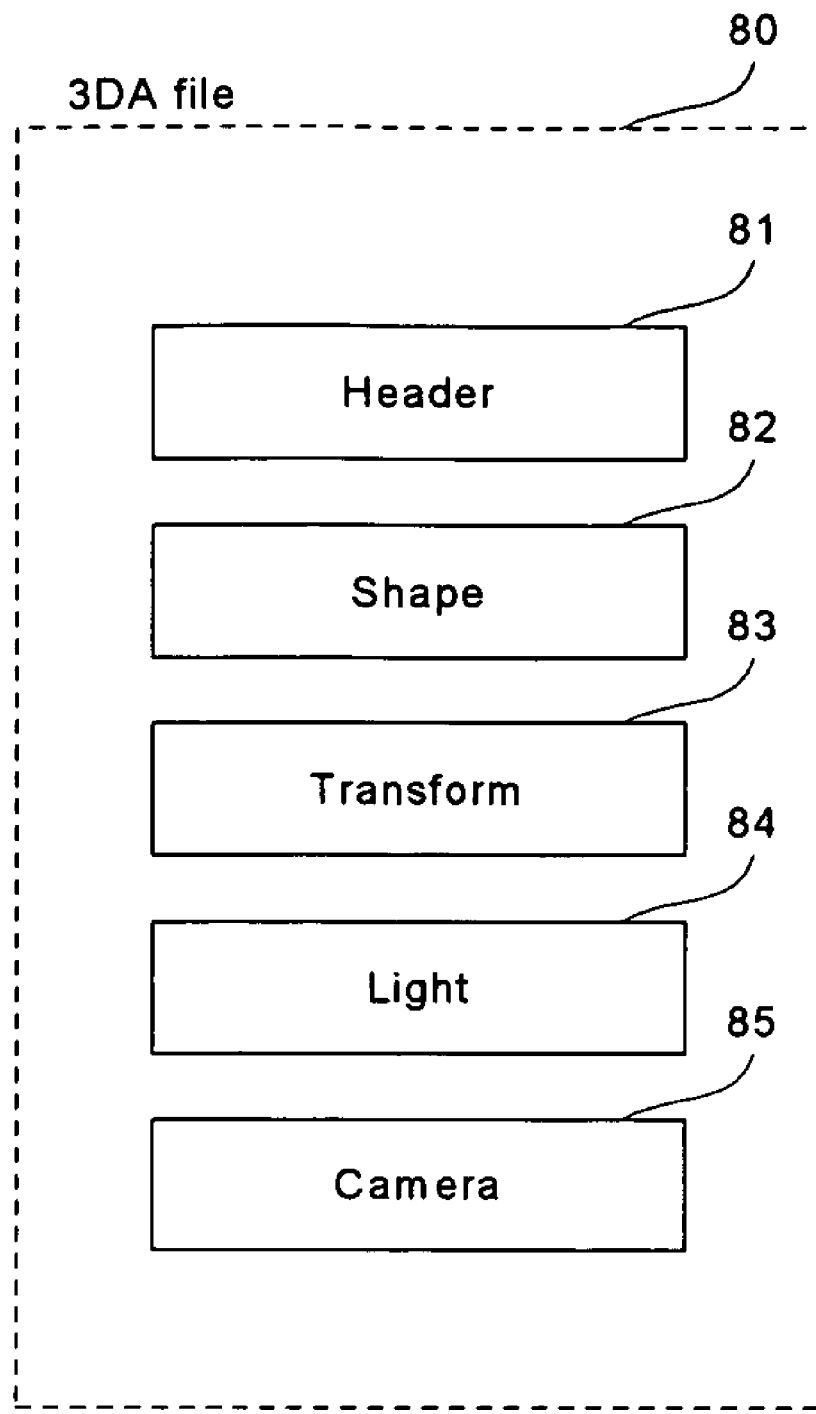
FIG. 8 shows the compressed file of a 3D scene.

3D scene information extracted by the 3DA applet is configured like the file contents shown in FIG. 8, including a Header 81, a Shape 82, a Transform 83, a Light 84, and a Camera 85. This information is stored in a single file as binary data. Each 3D scene information is identical to that described above.

Figure 9:
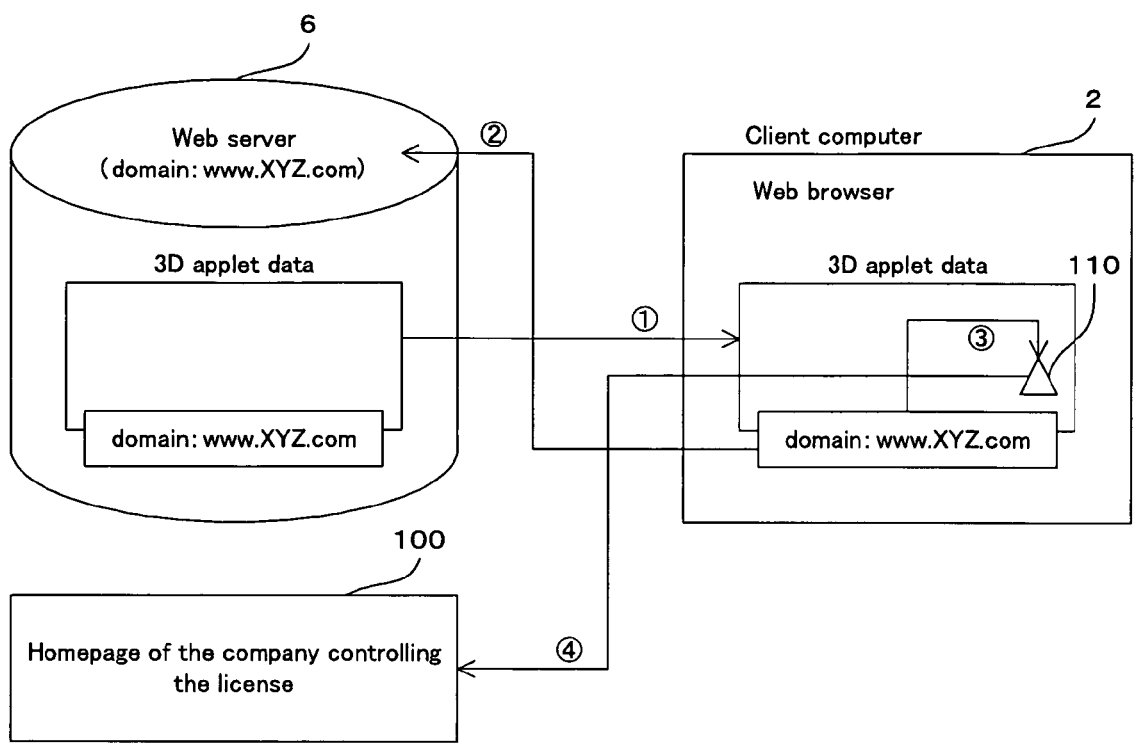
FIG. 9 shows a configuration for managing licensing information.

FIG. 9 shows the general configuration for managing licensing information. As shown in the first embodiment of FIG. 1, when the client-user's Web browser downloads a 3DA applet and the like from the Web server and displays 3D images, the applet serves to prevent unauthorized use by displaying licensing information.

Figure 2:
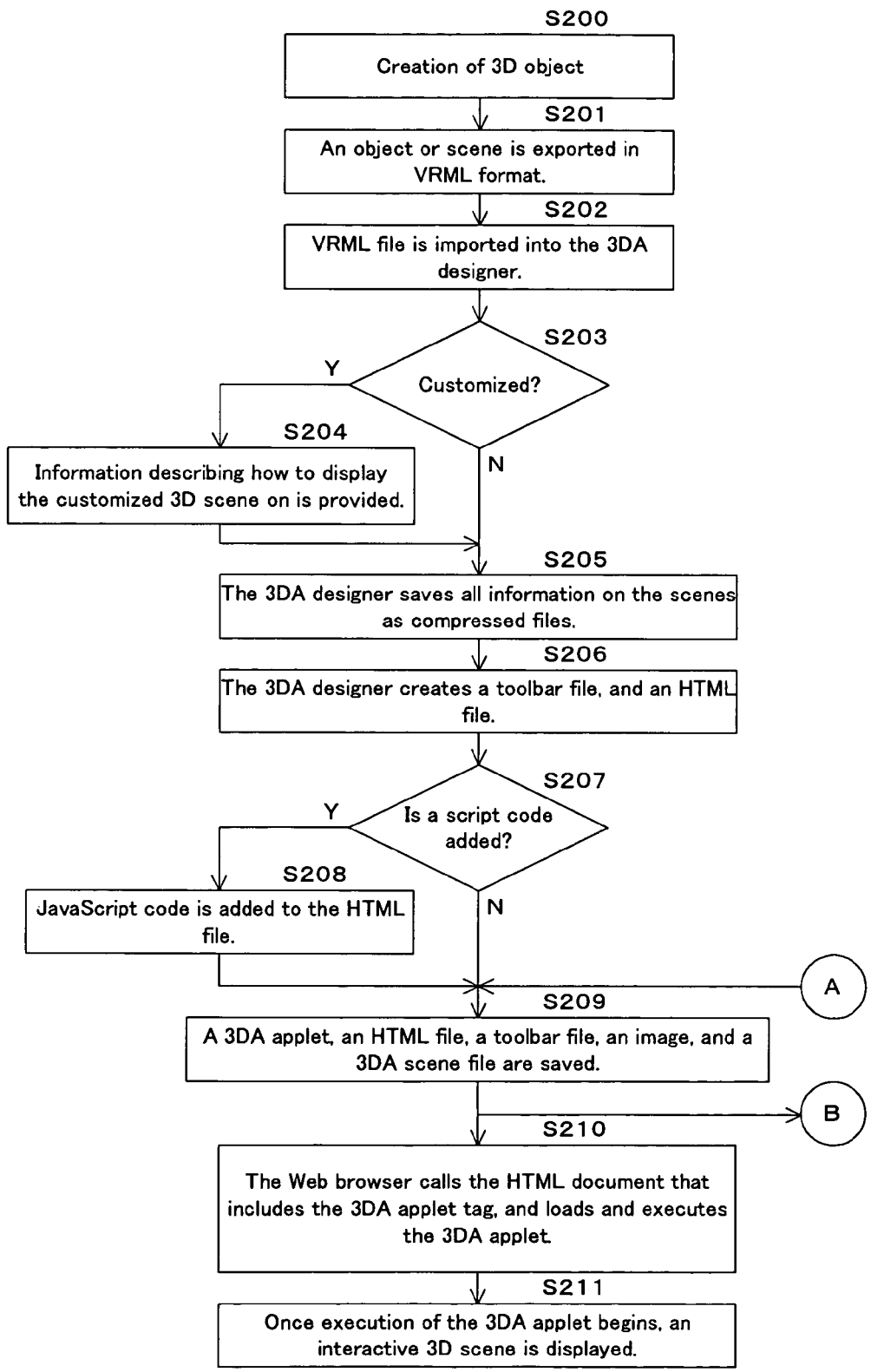
FIG. 2 shows the operations performed by a Web-based 3D-image display system according to a second embodiment.

First, domain information, such as the domain www.XYZ.com is embedded in the 3D applet's internal data when saving the 3D applet in S209 of FIG. 2, as described in the second embodiment. This process corresponds to S300 in section (A) of FIG. 3. While the applet is saved to a local storage device in the second embodiment, here the 3DA file is saved on the Web server, in place of the saving process of S205 in FIG. 2.

Figure 3:
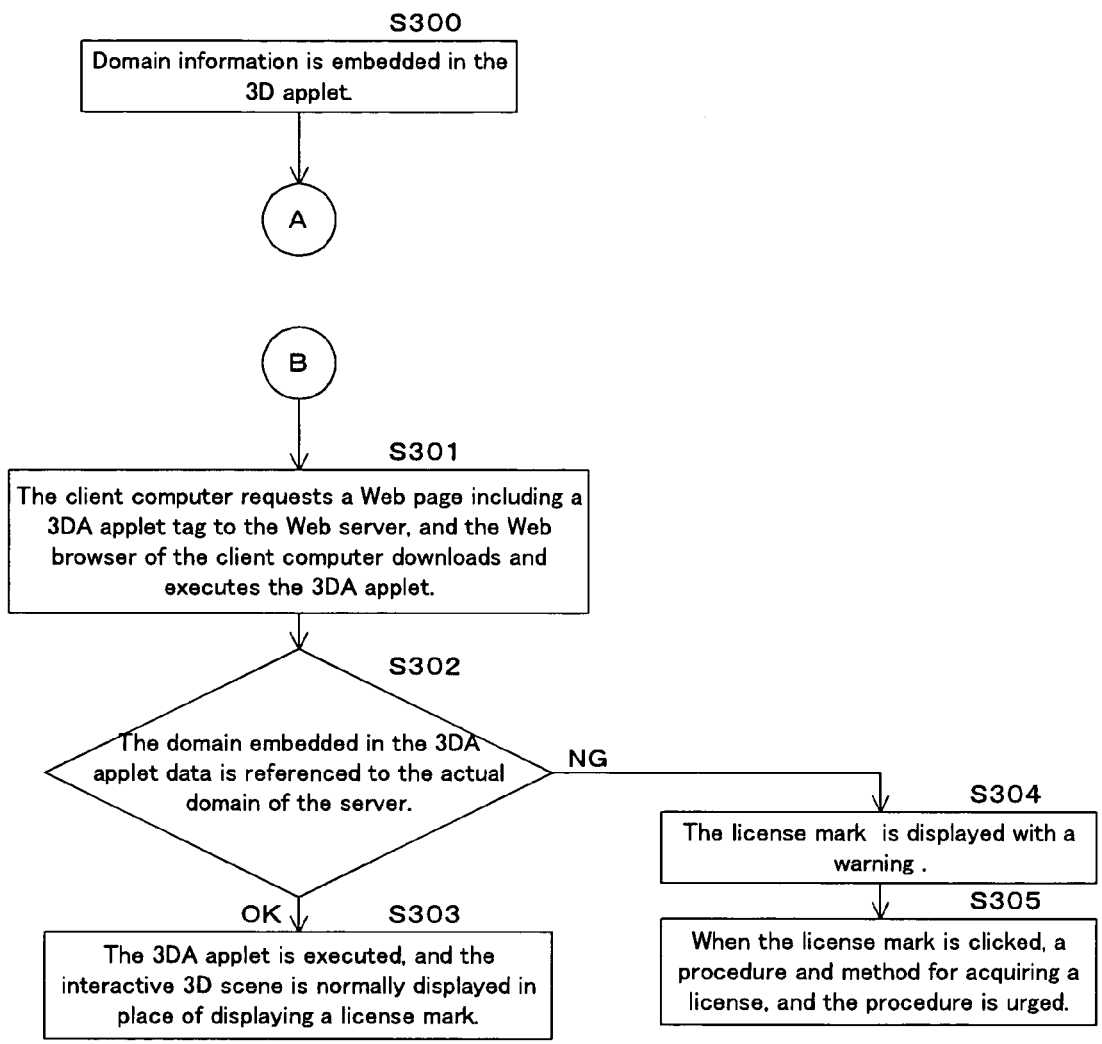
FIG. 3 shows the operations performed by the Web-based 3D-image display system when a security function is added to the operations of FIG. 2.

Next, when displaying the 3D scene image on the Web browser, the process jumps to S301 in (B) of FIG. 3, in place of the processes S210 for loading the 3D applet and S211 for displaying the applet shown in FIG. 2. The Web browser 2 downloads the 3DA applet and the like from the Web server and executes the 3DA applet (S301). By executing the 3DA applet, the process related to the licensing information is also performed. This process is implemented in (A) by referencing the domain embedded in the 3DA applet data and the actual domain (S302).

If both domains match, then the normal 3D display process is performed in place of displaying a license mark 110 (S303). However, if the domains do not match, then the license mark 110 is displayed with a warning (S304). Upon checking the logo display, the client-user clicks on the license mark 110 to access the homepage of the company managing the license and obtain information on the procedure for acquiring a license (S305).

More specifically, as shown in FIG. 9, the Web browser 2 (1) downloads 3DA applet information from the Web server 6, (2) extracts the domain embedded in the 3DA applet information and the original domain of the actual download, and (3) compares the domains. When the domains are different, the Web browser 2 displays the license mark 110 with in the drawing area of the 3D scene with a warning.

The client-user of the Web browser 2 clicks on the license mark 110 to jump to the homepage of the company controlling the license and acquires a license according to the displayed licensing acquisition method, procedures, and the like to display the 3DA scene. This process can prevent distributed 3DA applet information from being illegally copied and placed on multiple domains.

Next, the Web-based 3D-image display system according to a third embodiment will be described with reference to FIG. 10.

Figure 10:
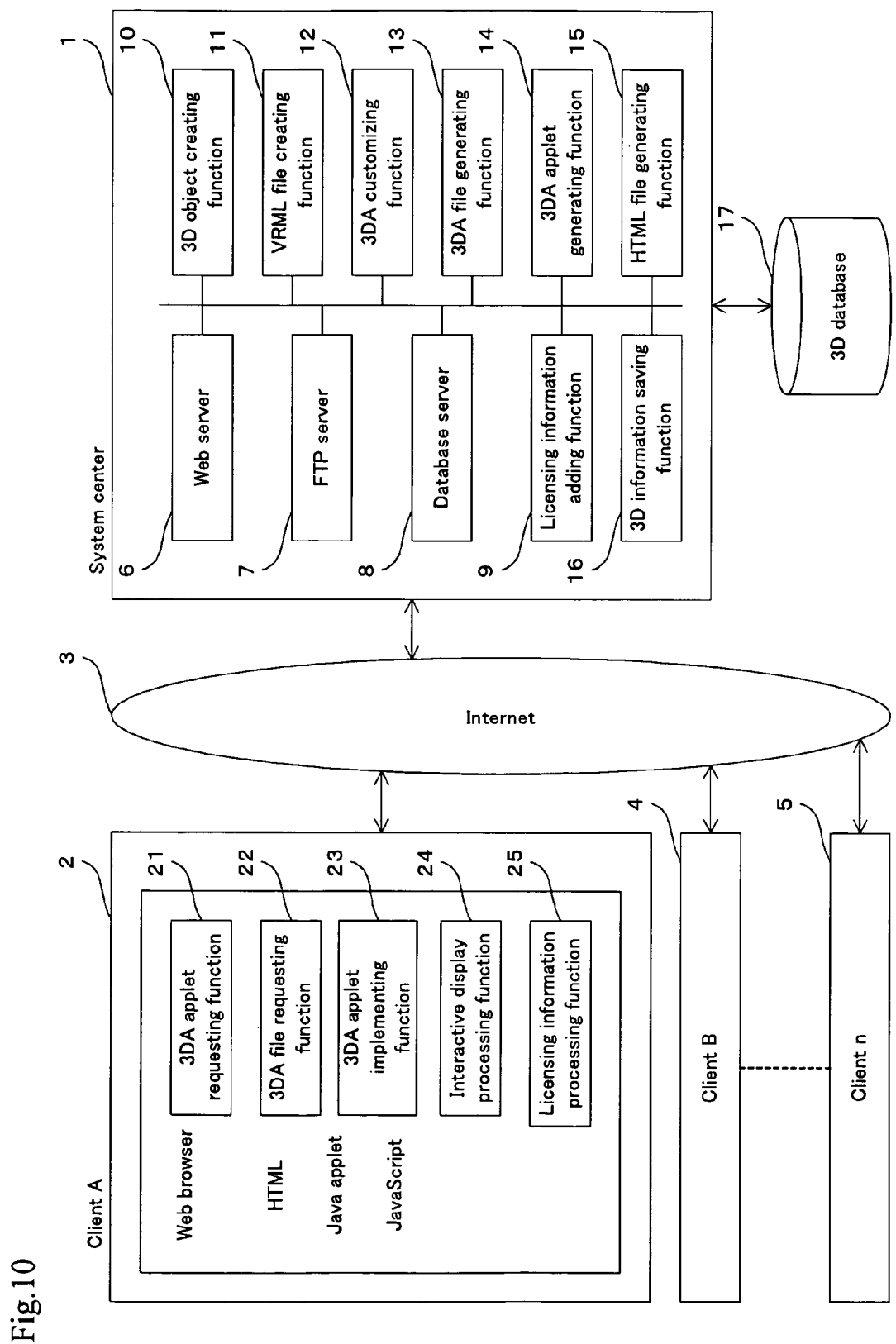
FIG. 10 shows the general construction of a Web-based 3D-image display system according to a third embodiment.

FIG. 10 shows the Web-based 3D-image display system configured as a business model having the above-described functions and structure. The system creates a database of 3DA files generated by the 3DA designer application and related developing tools, and other files containing 3DA information on a system center 1. The client-user downloads the 3DA information via the Web browser 2 from the Web server 6 of the system center 1. The Web browser 2 displays an interactive 3D image.

The Web server 6, 3DA designer application, and Web browser 2 in the system center 1 are each installed and executed on a commercial personal computer or workstation comprising an ordinary computer system. The personal computer or workstation is provided with a central processing unit (CPU); storage devices, such as RAM memory and a hard disk; a display device for displaying images, text, and the like; an input device, such as a keyboard, mouse, or the like; input/output devices connected to a communication line; and the like. As these components are well known in the art, a description of the components and drawings showing their construction have been omitted here.

Further, descriptions of processes already described above will not be repeated.

The system in FIG. 10 includes the system center 1, the Web browser 2 (Client A), Internet 3, another client 4 (Client B), and an unspecified number of clients 5 (clients n).

The system further comprises the Web server 6 in the system center 1 for distributing 3DA files and the like to Clients A, B, . . . , n via the Internet 3; an FTP server 7 for managing file transfers and the like and used for accessing the system center from an external application, although a description of that application will not be included here; a database server 8 for controlling database accesses; and a licensing information adding function 9 for displaying licensing information based on domain comparisons when displaying 3D images on the Web browser 2.

The system further comprises a 3D object creating function 10 for generating 3D objects by 3ds max and other 3D software; and a VRML file creating function 11 for converting the 3D object file to the VRML format.

The system further comprises a 3DA customizing function 12 and a 3DA file generating function 13 that use the 3DA designer application to extract scene information from the VRML file, add customizing information, and create and save a compressed 3DA file containing the necessary scene information; and a 3DA applet generating function 14 for creating a 3DA applet to display interactive 3DA images using the 3DA designer application. All applet classes necessary for displaying the 3D scene are saved as a single compressed file.

The system further comprises an HTML file generating function 15 that uses the 3DA designer application for automatically generating an HTML file for a Web page containing the applet tag, adding a JavaScript code to the HTML file, performing the procedure for adding optional requests, and editing and generating the HTML file. Each of the functions 10 to 15 saves each created or customized file in a 3D database 17 via a 3D information saving function 16 and a database server 8. Various 3D data including 3D parts, 3D image files and the like are stored in the 3D database 17.

Each Web browser contains functions for processing HTML, JAVA applets, and JavaScript. The Web browsers include a 3DA applet requesting function 21 for requesting to download 3DA applets from the Web server 6; a 3DA file requesting function 22 executed by the downloaded 3DA applet; a 3DA applet implementing function 23 for downloading 3DA files to display a 3D image; an interactive display processing function 24 enabling the Web browser itself to edit and operate the 3D display window; and a licensing information processing function 25 for referencing domains to perform processes related to licensing information.

As described above, the present invention enables an ordinary Web browser to display an interactive 3D scene, without the need of a special 3D-viewer plug-in, whereas existing 3D software, such as that used to create VRML files, cannot display a 3D scene on an ordinary browser unless a special 3D-viewer plug-in is installed in the browser.

Further, the system of the present invention does not require a broadband communication line to transmit 3D images. 3D images can be quickly transmitted over an ordinary Internet communication (phone) line, because the size of the transmitted 3D files are reduced to approximately 1/10 the size of an average animation file, thanks to the 3DA file compression process. Accordingly, the images can be displayed smoothly according to the 3DA applet method of displaying a 3D scene.

Further, once a 3DA file, a 3DA applet, and the optional items have been downloaded to the Web browser 2, an interactive display can be achieved without the Web browser 2 being in communication with the Web server. As a result, it is possible to display an interactive 3D scene more quickly than the conventional method, wherein a server-side program performs the processing and editing of 3D scenes and the client-user's Web browser 2 must issue a request to the server to process and edit the scene.

The present invention can also be used in e-commerce. For example, if a company has an online catalog that includes a 3D image of a car, that image can be displayed on a client-user's browser. By using a mouse, the client-user can freely rotate the body of the car in all directions to view the car from any perspective, for example, to see the underside of the car. Also by use of the mouse, the client-user can display the inside of the car, for example, in order to see the color and other aspects in the appearance of the seats. The client-user is able to view the car's image as if the client-user were actually seeing a real car. If ordering a car online, the client-user can specify the color of the car's body by painting the car a desired color and transmitting the image to the automobile dealer. Similarly, when a real estate agent exhibits a 3D image of a model home via the Internet, the client-user can freely move furniture in the room using the mouse and can specify the wall colors of rooms when ordering a home by painting the walls a desired color, without having to go to the actual model room.

Furthermore, the present invention can be applied to the creation of on-line games, as well as the display of all other types of 3D images.

As described above, a bi-directional Web-based 3D-image display system according to the present invention displays 3D images on a Web browser by extracting 3D scenes from a standard Web-based 3D file, such as a VRML file created by one of various conventional 3D modeling software programs. The system edits, processes, and compresses the 3D file and saves the file on the Web server. By downloading a 3DA applet and the compressed 3D file from the Web server, the client-user's Web browser displays the 3D scene on a JAVA VM (virtual machine). After downloading and receiving all information, the Web browser can continuously displays an interactive 3D scene independently of the Web server by executing the 3D applet. Accordingly, the Web-based 3D-image display system of the present invention can display 3D scenes smoothly without requiring that a special 3D-viewer plug-in be installed in the Web browser and without requiring a broadband communications line, and the Web browser can independently edit and process the 3D scenes. Further, the present invention can inhibit unauthorized use of 3D images through the display of licensing marks and the like.

What is claimed is:

1. A web-based 3D-image display system that downloads a 3D-image file from a Web server and displays a 3D image on a Web browser, the Web-based 3D-image display system having:
   a Web server storing compressed 3D files and a 3D applet, wherein the compressed 3D files are obtained through:
      editing 3D-scene information extracted from a Web 3D file described in a standard descriptive language for describing Web-based 3D graphics, and
      creating 3D-scene information having an interface with a 3D applet for displaying 3D scenes, and compressing the edited and created 3D scene information into a single file; and a 3D applet is obtained by selecting classes necessary for displaying the 3D scenes from each of classes comprising a plurality of core classes—which are used for displaying the 3D scenes by executing real-time 3D-rendering and 3D- motion algorithms—and compressing them into a single file; and
   a Web browser for displaying the 3D scenes by downloading the compressed 3D-image file and the 3D applet for displaying the 3D scenes from the Web server; wherein the Web browser comprises:
      3D applet requesting means for requesting and downloading the 3D applet from the Web server through communications with the Web server;
      compressed 3D file requesting means for executing the 3D applet and requesting and downloading the compressed 3D file from the Web server;
      optional information requesting means for requesting and downloading optional information—including a scene's background image, a shape texture, and an applet toolbar which can select types of rendering functions with a toolbar button for rendering the 3D scenes by moving, rotating, enlarging and reducing an object—from the Web server;
      3D applet executing means for the Web browser to execute the 3D applet independently, not via the Web server, after completing the download and receiving all necessary information;
      3D scene displaying means for the Web browser to continuously display 3D scenes by independently executing, not via the Web server, real-time 3D-rendering and 3D-motion algorithms using the 3D applet executing means; and
      interactive display processing means for enabling interactivity between the displayed 3D scene and client users.

2. A Web-based 3D-image display system that loads a 3D-image file stored in a storage device and displays a 3D image on a Web browser, the Web-based 3D-image display system comprising:
   Web-based 3D-file creating means for generating a 3D object by using a 3D modeling software program and converting the generated 3D object or an entire 3D scene into a file format described in a standard descriptive language for describing Web-based 3D graphics;
   3D scene customizing means for customizing a 3D scene based on the Web-based 3D file created by the Web-based 3D file creating means and providing information regarding an interface with the 3D applet for displaying the 3D scene on the Web browser;
   compressed 3D file generating means for creating a single 3D compressed file by compressing the 3D-scene information obtained by the 3D scene customizing means;
   3D applet generating means for generating the 3D applet that is obtained by selecting classes necessary for displaying the 3D scenes from each of classes comprising a plurality of core classes—which are for displaying 3D scenes by executing real-time 3D-rendering and 3D-motion algorithms on the Web browser based on 3D scene information in the compressed 3D file—and compressing them into a single file;
   applet toolbar generating means for generating an applet toolbar that can select types of the rendering functions by displaying—on a Web browser—a toolbar button, which is for rendering the 3D scenes by moving, rotating, enlarging and reducing an object;
   Web page creating means for creating a Web page of an HTML document comprising an applet tag for calling the 3D applet and the applet toolbar;
   3D information storing means for storing in a storage device the compressed 3D file, the 3D applet, the Web page, texture files, and an optional toolbar file, which are required for displaying the 3D scenes;
   3D applet executing means for requesting a 3D applet stored in the storage device, loading the 3D information file stored in the storage device, and executing the 3D applet, using the Web browser; and
   interactive display processing means for displaying a user-interactive 3D scene, which is interactive with users, by executing the 3D applet and the applet toolbar.

3. The Web-based 3D-image display system as described in claim 1, wherein the interactive display processing means enables the Web browser to edit and process a 3D scene independently of the Web server, not via the Web server, by transferring to the 3D applet and the applet toolbar client-user events input by an input means for moving and changing a downloaded toolbar, and scene objects.

4. The Web-based 3D-image display system as described in claim 1, further comprising licensing information processing means for comparing the domain of the Web server itself with domain data embedded in the 3D applet when the Web browser downloads the 3D applet from the Web server and displays a 3D scene.

5. The Web-based 3D-image display system as described in claim 4, wherein the licensing information processing means compares the two domains and displays a license mark and warning in the drawing area of the 3D scene when the domains do not match.

6. The Web-based 3D-image display system as recited in claim 1, wherein the 3D applet comprises a plurality of applet classes including at least scene element classes, which are at least one of shape, coordinate transform, light, and camera; shader classes, which are at least one of wire frame, flat shading, and Gouraud shading; and a plurality of core classes for displaying 3D images; whereby the classes necessary for displaying the 3D scene are selected and saved as a single compressed file.

7. The Web-based 3D-image display system as recited in claim 1, wherein the 3D applet comprises an original JavaScript interface capable of achieving user-interactivity through the JavaScript code on a Web page.

8. The Web-based 3D-image display system as recited in claim 7, wherein the JavaScript interface includes at least information regarding objects, shapes, coordinates, cameras, animation, image displaying, and client-user interface in order to display interactive 3D images.

9. The Web-based 3D-image display system as recited in claim 1, wherein the compressed 3D file is stored in a single binary file and comprises 3D scene information called from an applet, including at least information regarding shapes, coordinate transform, lights, and cameras.

10. The Web-based 3D-image display system as recited in claim 1, wherein the standard descriptive language for describing Web-based 3D graphics is VRML.

11. The Web-based 3D-image display system as recited in claim 2, wherein t the standard descriptive language for describing Web-based 3D graphics is VRML.

12. The Web-based 3D-image display system as described in claim 2, wherein the interactive display processing means can edit, process, and operate a 3D scene by transferring user events, which are input using an input device for performing operations such as movement and chance of loaded toolbar and scene objects, to the 3D applet and the applet toolbar and executing them.

13. The Web-based 3D-image display system as recited in claim 2, wherein the 3D applet comprises a plurality of applet classes, and the classes necessary for displaying the 3D scene are selected from each of classes comprising at least scene element classes, which are at least one of shape, coordinate transform, light, and camera; shader classes, which are at least one of wire frame, flat shading, and Gouraud shading; and a plurality of core classes for displaying 3D images, and saved as a single compressed file.

14. The Web-based 3D-image display system as recited in claim 2, wherein the 3D applet comprises an original JavaScript interface capable of achieving user-interactivity through the JavaScript code on a Web page.

15. The Web-based 3D-image display system as recited in claim 2, wherein the compressed 3D file is stored in a single binary file and comprises 3D scene information called from an applet, including at least information regarding shapes, coordinate transform, lights, and cameras.

* * * * *